(12) United States Patent
Donnelly et al.

(10) Patent No.: US 10,679,062 B1
(45) Date of Patent: Jun. 9, 2020

(54) SYSTEMS AND METHODS FOR DEVICE POSITIONING SURFACE DETECTION

(71) Applicant: Primer Supply, Inc., Oakland, CA (US)

(72) Inventors: Timothy Donnelly, Oakland, CA (US); Adam Debreczeni, Oakland, CA (US); Russ Maschmeyer, Oakland, CA (US)

(73) Assignee: Primer Supply, Inc., Oakland, CA (US)

( * ) Notice: Subject to any disclaimer, the term of this patent is extended or adjusted under 35 U.S.C. 154(b) by 0 days.

(21) Appl. No.: 16/702,283

(22) Filed: Dec. 3, 2019

(51) Int. Cl.
*G06K 9/00* (2006.01)
*H04N 5/232* (2006.01)
*G06T 11/00* (2006.01)

(52) U.S. Cl.
CPC ........ *G06K 9/00671* (2013.01); *G06T 11/001* (2013.01); *H04N 5/23222* (2013.01); *H04N 5/23258* (2013.01)

(58) Field of Classification Search
CPC .. G06T 11/001; G06T 19/006; H04N 5/23258
See application file for complete search history.

(56) References Cited

U.S. PATENT DOCUMENTS

| | | | |
|---|---|---|---|
| 9,509,981 B2 | 11/2016 | Wilson et al. | |
| 9,767,566 B1* | 9/2017 | Paczkowski | ....... H04N 1/00204 |
| 10,297,088 B2 | 5/2019 | Rhodes et al. | |
| 2012/0218444 A1* | 8/2012 | Stach | .................... G06T 1/0021 |
| | | | 348/241 |
| 2017/0301143 A1* | 10/2017 | Gorumkonda | ........ G06T 19/006 |
| 2018/0185100 A1* | 7/2018 | Weinstein | ............ A61B 90/361 |
| 2018/0205963 A1* | 7/2018 | Matei | ..................... H04N 19/46 |
| 2019/0122441 A1* | 4/2019 | Agrawal | ............ G06K 9/00671 |
| 2019/0339058 A1* | 11/2019 | Dryer | .................... G06F 1/1626 |
| 2019/0362539 A1* | 11/2019 | Kurz | ....................... G06T 19/20 |
| 2020/0005447 A1* | 1/2020 | Salgian | .................... G06T 7/001 |

OTHER PUBLICATIONS

Spark AR, "Scripting Object Reference" Dec. 3, 2019 (available at https://sparkar.facebook.com/ar-studio/learn/documentation/reference/scripting/summary/).

(Continued)

*Primary Examiner* — Jeffery A Brier
(74) *Attorney, Agent, or Firm* — Ryan Alley IP

(57) ABSTRACT

Methods, hardware, and software establish surfaces for graphics processing by setting a position of the capture device fixed on or relative to that surface. A user may hold the device against the surface or through other means. Ambient setting, potentially including the surface itself, is visually captured at the position. Using that position the surface is established—readily known by position, size, shape, etc. within the surroundings. Stable positioning can be determined in any way, using any data. Motion of the device may be known via internal or external sensors, and stable surface touching can be detected with a lack of motion. A user may input when the device is steady. Abutment can be measured from visual input or impact sensors. All such input may determine and/or verify a stable position. Visual input from the stable position may thus be used to establish the surface for graphical processing.

20 Claims, 3 Drawing Sheets

(56) References Cited

OTHER PUBLICATIONS

Apple Developer, "ARKit," Dec. 3, 2019 (available at https://developer.apple.com/documentation/arkit).
ARCore "Using the ARCore SDK for iOS to create Cloud Anchors," Dec. 3, 2019 (available at https://developers.google.com/ar/develop/ios/cloud-anchors/overview).
Taehee Lee et al., "Hybrid Feature Tracking and User Interaction for Markerless Augmented Reality," Virtual Reality Conference, 2008. VR '08. IEEE, Apr. 2008.

* cited by examiner

SYSTEMS AND METHODS FOR DEVICE POSITIONING SURFACE DETECTION

BACKGROUND

FIG. 1 is a schematic of a related art user device 100 illustrating components thereof that may permit creation of immersive content, such as augmented reality (AR) 101. AR applications may use an overlay of graphical/added subject matter on live or recorded video or still images presented on device 100. For example, a user or application may position a static graphic, text, or other visual element superimposed on the underlying video or image. Augmented reality applications may also augment underlying visual data by changing or replacing select elements in the underlying environment and tracking those elements as if they are actually present in the underlying environment, or use the underlying visual data to position the augmented reality subject matter as displayed. For example, an underlying object may be recognized in a video feed or image still of an environment, and the augmented reality application may superimpose additional elements on or apply coloration, designs, distortions, etc. to, or relative to, the object, so as to further the augmented reality effect that the object and surrounding environment actually includes such elements or characteristics.

To handle AR, device 100 may include a camera package 110 including a lens, image sensor, and/or microphone, a computer processor 120, persistent and/or transient storage 130, external communications 140, display 180, AR configuration 170, and/or input device and input sensors 185. Although elements are shown within a single device 100, it is understood that any element may be separate and connected through appropriate communications such as an external bus for a peripheral or wired or wireless connection. Processor 120 may include one or more computer processors connected to and programmed or otherwise configured to control the various elements device 100. Processor 120 may further be configured to create, transmit, and/or perform augmented reality 101 in accordance with programming or input and may potentially include an associated processor cache, transient memory, video buffer, etc., configured or programmed to processes AR 101. For example, AR configuration 170 may include software and/or firmware that instruct processor 120 how to create or display AR 101 received from an application or outside source. Processor 120 may also receive sensor information from sensors 185, e.g., touch or cursor information, and process the same as user interaction or input. Processor 120 may further execute software or include configured hardware that allows for execution of example methods discussed below.

Storage 130 may be a dedicated data storage drive or may be a partition of a general data store in which augmented reality information, origin or limitation information, application information, and/or device operations and raw data can be saved. Storage 130 may be, for example, random access memory (RAM), read only memory (ROM), programmable read only memory (PROM), erasable programmable read only memory (EPROM), electronically erasable programmable read only memory (EEPROM), flash memory, a hard disk, a processor cache, optical media, and/or other computer readable media.

Camera 110 may include one or more lenses and/or apertures that may be controlled by actuators that move the lenses and apertures among different positions to focus captured optical data. Similarly, camera 110 may adjust focus digitally or in response to user input defining focus locations in the scene being captured. Camera 110 may include image sensor elements such as a charge coupled device (CCD) array, a photodiode array, or any other image sensing device that receives light, potentially via the lens, and generates image data in response to the received light. Camera 110 may include a light to aid in reflection and/or focusing laser. Camera 110 may be further configured to obtain or adjust image information such as focus, zoom, white balance, exposure, saturation, and/or other image functions. Camera 110 and/or processor 120 may be further configured with one or more video codecs or other image processing software or drivers to capture, process, and store external independent media such as actual video from the environment as well as augmented reality. An included microphone may be any auditory transmission and/or reception device capable of audio pickup and/or playback.

Display 180 may be a screen, viewfinder, monitor, projector, glasses front, or any other device capable of visually displaying visual augmented reality 101. For example, display 180 may be a touchscreen on a smartphone like iOS or Android devices or on a tablet like an iPad or Surface, or display may be an LCD monitor or projector, for example. Sensors 185 provide input information, potentially as a part of display 180 and/or as a separate component. For example, if display 180 is a touchscreen, sensors may be embedded multi- or single-touch capacitive sensors capable of detecting finger or stylus touch, pressure, movement, etc., with respect to display 180. Or for example, sensors 185 may be an accelerometer or magnetized compass with associated hardware or software capable of determining device orientation and/or movement. Or for example, sensors 185 may be a button or an external mouse or joystick and associated hardware or software capable of controlling and determining cursor position and/or activation with respect to display 180 during operation of device 100. Sensors 185 are connected to processor 120 and can deliver sensed input information to processor 120 with respect to display 180, including cursor or contact position, duration, numerosity, pressure, movement speed, etc.

Device 100 may further include a communications port 140 for external wired or wireless communication. For example, communications port 140 may be an antenna configured to transmit and receive on CDMA bands, a Wi-Fi antenna, a near field communications transmitter/receiver, a GPS receiver, an external serial port or external disk drive, etc. Processor 120 may provide data from storage 130, input data from camera 110, sensors 185, etc., to external devices through communications port 140, as well as receive application and/or augmented reality and other information from providers through port 140. Further, communications port 140 may function as another input source for sensors 185.

Device 100 may be mobile, such as a laptop, smartphone, wearable, dashcam, camcorder, GPS device, etc., or device 100 may be relatively immobile, such as a desktop computer, wide-area network, fixed security camera, etc. Although networked elements and functionalities of device 100 are shown in FIG. 1 as individual components with specific groupings and subcomponents, it is understood that these elements may be co-located in a single device having adequately differentiated data storage and/or file systems and processing configurations. Alternatively, the elements shown in FIG. 1 may be remote and plural, with functionality shared across several pieces of hardware, each communicatively connected at adequate speeds to provide necessary data transfer and analysis, if, for example, more resources or better logistics are available in distinct locations.

SUMMARY

Example methods and embodiment devices capture a surface, like a countertop, ceiling, or wall, for tracking in graphics processing, including immersive processing like AR or VR, by assuming a high-fidelity position with respect to that surface. For example, a mobile device or computer may instruct a user to hold a camera and/or the device against the surface, or may simply detect when such a position is held. With the device at a known, relatively constant position, the surroundings of the surface, potentially including the surface itself, are visually captured at the position. Then, using that known position, the surface position, size, shape, and other characteristics within the surroundings can be accurately determined, or established, for use in graphics processing. For example, the established position can be output to an AR application that may modify/augment and track the surface in the surroundings as displayed on the device as AR.

Example methods and devices can determine stable positioning against the surface in several different ways and with several different types of input. For example, motion of the device may be known through an accelerometer, level, GPS receiver, compass, etc.; a lack of motion for a threshold period of time, or an abrupt stopping of motion following movement, may indicate stable abutment with the surface. Similarly, a user may be instructed to put the device against the surface and touch an on-screen button or give other input when the device is steadily positioned. Yet further, visual input from the device's camera that detect motion, pressure sensors on the device that detect its being pressed to the surface, a lack of any other activity on the device for a threshold amount of time, etc. may all indicate rest on the surface. Any of these metrics may be used alone or in combination, potentially in serial or looped verification fashion, to ensure a stable position where visual input will establish the surface based on that stable position.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Figure 1:
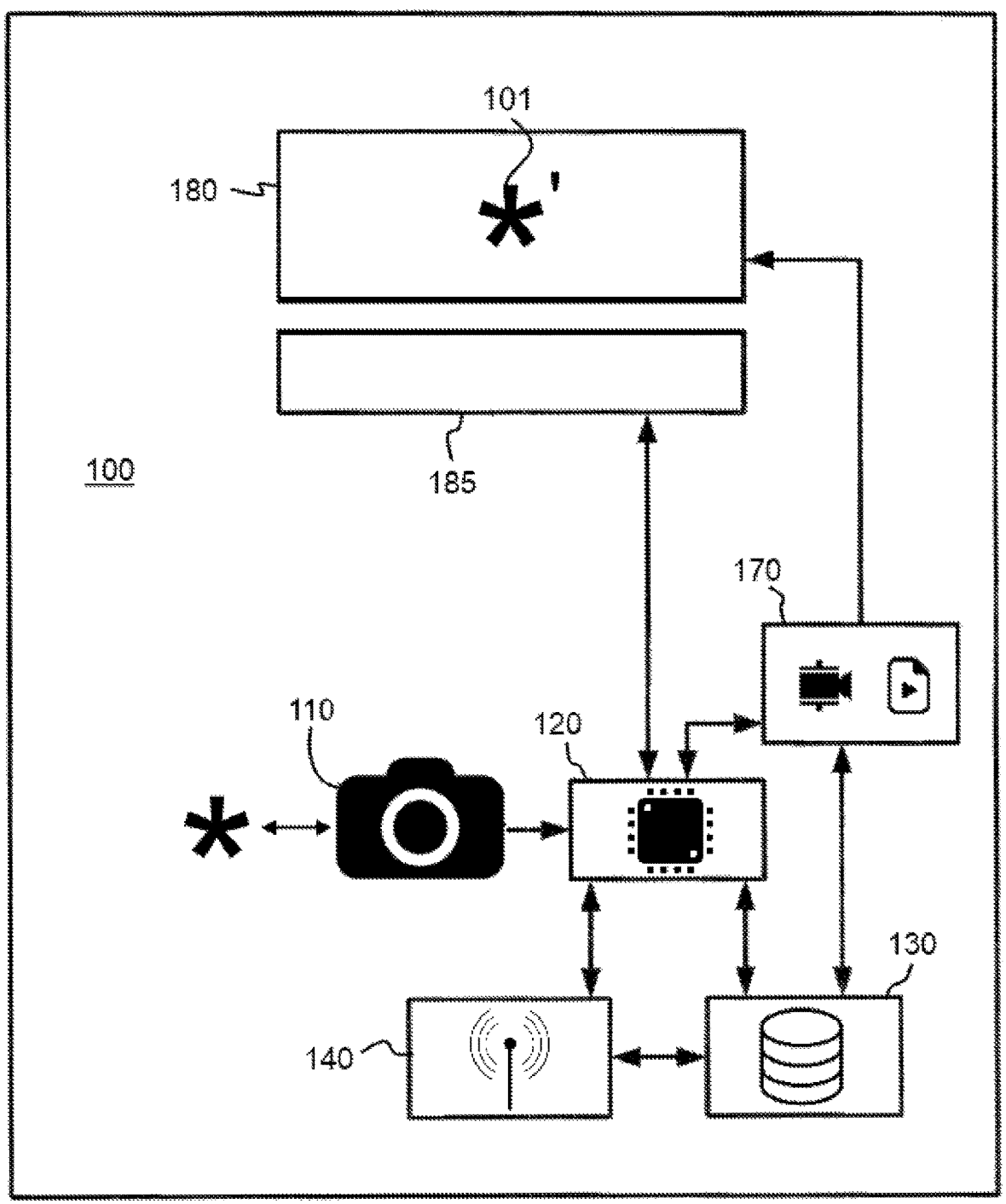
FIG. 1 is an illustration of a related art device useable in graphics processing.

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

Modifiers "first," "second," "another," etc. may be used herein to describe various items, but they do not confine modified items to any order. These terms are used only to distinguish one element from another; where there are "second" or higher ordinals, there merely must be that many number of elements, without necessarily any difference or other relationship. For example, a first element could be termed a second element, and, similarly, a second element could be termed a first element unless an order or difference is separately stated. In listing items, the conjunction "and/or" includes all combinations of one or more of the associated listed items. The use of "etc." is defined as "et cetera" and indicates the inclusion of all other elements belonging to the same group of the preceding items, in any "and/or" combination(s).

When an element is related, such as by being "connected," "coupled," "mated," "attached," "fixed," etc., to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two devices, including intermediary devices, networks, etc., connected wirelessly or not.

As used herein, singular forms like "a," "an," and the are intended to include both the singular and plural forms, unless the language explicitly indicates otherwise. Indefinite articles like "a" and "an" introduce or refer to any modified term, both previously-introduced and not, while definite articles like "the" refer to the same previously-introduced term. Possessive terms like "comprises," "includes," "has," or "with" when used herein, specify the presence of stated features, characteristics, steps, operations, elements, and/or components, but do not themselves preclude the presence or addition of one or more other features, characteristics, steps, operations, elements, components, and/or groups thereof. Rather, exclusive modifiers like "only" or "singular" may preclude presence or addition of other subject matter in modified terms.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

The inventors have recognized that computers rendering immersive experiences or other image processing, including AR, often need to determine surfaces in an environment for modelling quickly and accurately—for example, seamlessly finding real-world horizontal and vertical planes on which to place or root virtual objects. Visual input alone, such as through a camera, is typically used to identify surfaces and visual features thereon for image analysis and modification, including positioning, size, relative features, and orientation. The inventors have recognized that such input often fails when surfaces are clear like glass, reflective like a mirror or glossy page, or featureless like a white wall. Detection is challenging and error prone because of the lack of visually-mappable features or characteristics that computer vision systems need to establish the presence, size, and orientation of the surface, e.g., to establish the surface in AR. Surface recognition and subsequent manipulation may thus be impossible, or cumbersome in requiring additional actions by a user such as tagging the surface, changing lighting, or inputting physical characteristics of the surface, before it can be established. The inventors have developed example embodiments and methods described below to address these and other problems recognized by the Inventors with unique solutions enabled by example embodiments.

The present invention is devices, software as stored or executed on tangible computer-readable media, and methods for inputting surfaces based on stable device position with respect to the same. In contrast to the present invention, the few example embodiments and example methods discussed below illustrate just a subset of the variety of different configurations that can be used as and/or in connection with the present invention.

Figure 2:
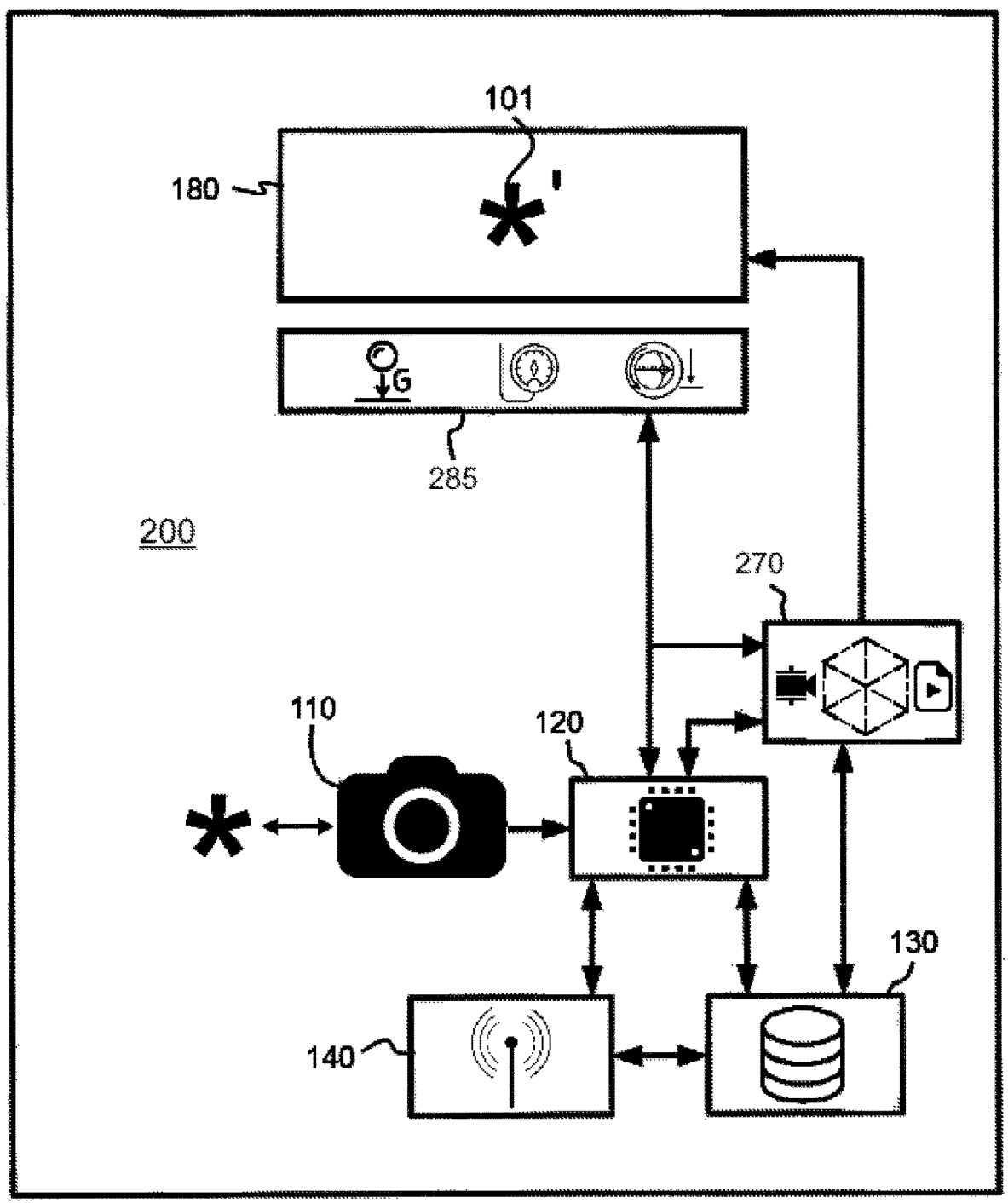
FIG. 2 is an example embodiment device configured to execute example methods.

FIG. 2 is an illustration of an example embodiment device 200 configured to determine surface positioning and potentially execute example methods. For example, device 200 may establish a plane like a featureless wall or floor for use in AR. As shown in FIG. 2, device 200 may include several elements from related device 100 of FIG. 1. Example embodiment device 200 includes at least one sensor 285 outputting data useable to determine surface location and/or orientation. For example, sensor 285 may include a compass, magnetometer, accelerometer, level, gyroscope, directional antenna, pressure detector or touch input, and/or arrays of the same capable of determining movement, rest state, orientation with respect to compass directions and/or gravity, global position, and/or user input of verification or device position.

Example embodiment device 200 is further configured to determine and utilize surface positioning from visual input of camera 110 as well as other input. Such configuration may be software, firmware, or hardware executing image processing 270. Image processing 270 may include, for example, surface and/or edge detection software or drivers. Image processing 270 may include AR or VR functionality, including AR toolkits such as Spark AR, ARKit, and/or ARCore, whose documentation are respectively available at sparkar.facebook.com/ar-studio/learn/documentation/reference/scripting/summary, developer.apple.com/documentation/arkit, and developers.google.com/ar/develop/ios/cloud-anchors/overview, incorporated by reference herein in their entireties. Image processing 270 may include separate image processing software stored in transient or permanent memory and executed by processor 120, its own GPU, and/or be a functionality of processor 120 itself, such as through proper programming, for example.

Sensor 285 may directly provide information to image processing 270 and/or processor 120 to allow determination of planes and surfaces from environmental imagery captured by camera 110. Image processing 270 and/or processor 120 further use such determined planes or surfaces in presentation of AR 101 on display 180. For example, an identified surface may be recolored or uniquely filtered and tracked to an underlying real surface in a visual environment captured by camera 110, such altered surface being performed with display 180 as AR 101. Camera 110, sensors 285, display 180, processors 120, and image processing 270 may all be collocated, such as in a mobile device, or remote. For example, input from camera 110 and/or sensors 285 may be from places far apart in space and time and potentially saved, with processor 120 and/or image processing 270 executing example methods with them at yet different locations or later times.

Figure 3:
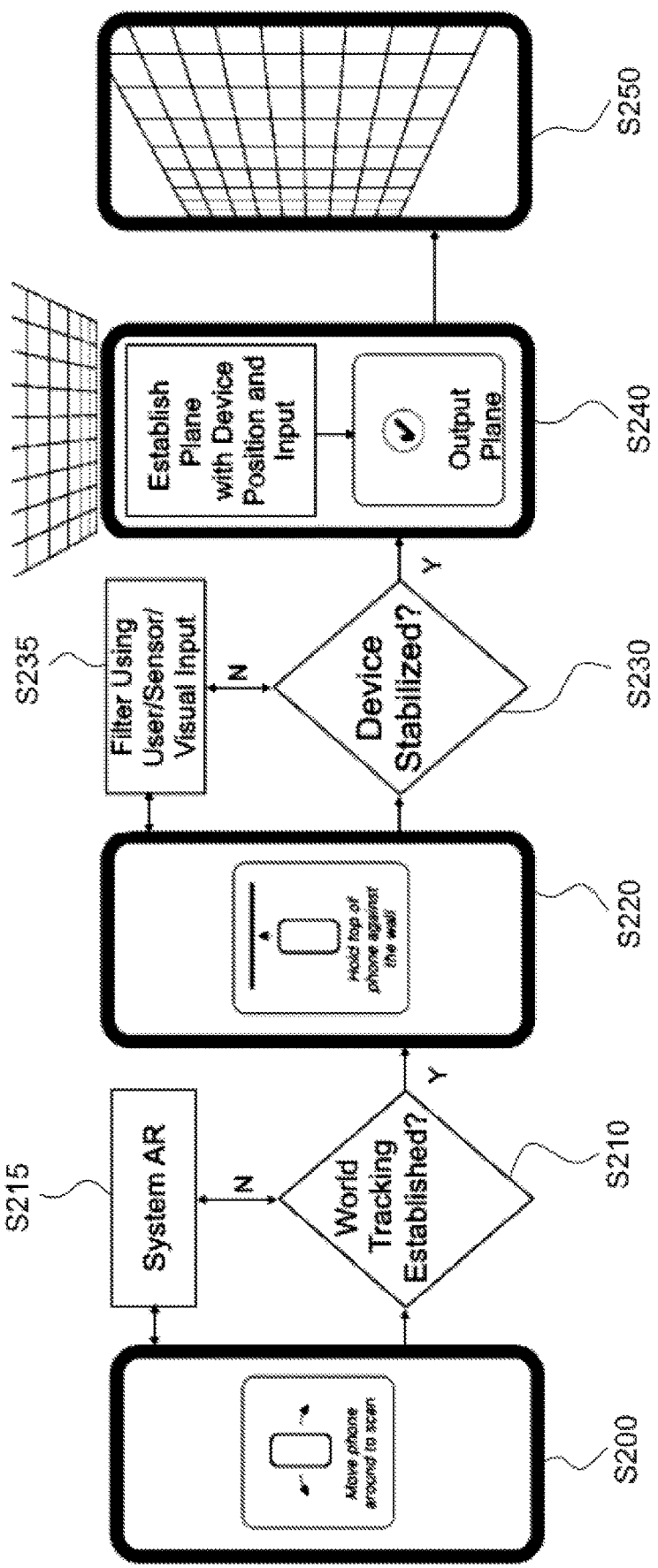
FIG. 3 is a screen flow illustrating actions and device states in an example method.

FIG. 3 illustrates an example method as a screen flow on an example embodiment device, which could be example embodiment device 200 from FIG. 2, as a smartphone or tablet. As seen in FIG. 3, in S200, an image/video capture or AR mode may be activated on the device. This may include activating a camera, selecting a native option, starting an AR app, etc., that allows visual capture, such as by camera 110 in device 200 of FIG. 2, of the surrounding environment. In S200, world tracking for immersive addition, such as AR or VR, may be established by moving the device and camera about the environment or otherwise inputting environmental characteristics and relative positioning to establish world tracking.

In S210, immersive setup is completed by checking that world tracking is established and/or accurate. If world tracking is established in S210, example method may proceed to S220. If world tracking is not established in S210, additional instruction may be given to a user or additional analysis applied to visual input by the image processor in S215. These actions of establishing accurate immersion are optional and may be conducted by native or specific AR applications, such as ARKit, AR Core, etc. incorporated by reference above, in, for example an image processor 270 as shown in FIG. 2. It is understood that preparation of a device for immersive content and establishing world tracking, like for AR or VR, in S200 and S210 may be partial, incomplete, or omitted in example methods.

In S220, the processor, potentially through the device, requests the user to place the device and/or camera at a known position with respect to a surface of interest. For example, a user may input an "identify wall" option in the device, and the device may instruct the user to "place the bottom edge of the device against the wall" in S220. Or, for example, image processing software, such as that in image processor 270 of example device 200 in FIG. 2, may detect a surface in visual input to the device and then display an icon or external light indicating a particular side or edge of the device should be placed on the surface. The processor may identify the detected surface with highlighting, text, or arrow, for example, or the user may input a detected surface, such as by clicking or pressing on the surface on a touchscreen. Alternatively, no surface may be detected by or input into the device in S220, in which case the device may simply await stabilization on a surface. The indication or request for surface abutment may be delivered in any mode or format, potentially on or outside the device, in S220.

In S230, the processor determines if the device, or at least the visual capture device, is stabilized on the surface. This may be done in several ways. For example, a user may select an option or give other input indicating stabilization on the surface. Or, for example, an accelerometer or gyroscope may detect device movement in a direction followed by abrupt stopping of that movement without resumption, indicating the device is stabilized on the surface. Or, for example, a button or pressure sensor on an edge of the device may detect new contact with a surface without removal. Or, for example, a magnetometer or directional antenna may detect movement of the device with respect to geomagnetic north or a known signal emitter followed by no further movement in the previous manner, indicating the device has stabilized against the surface.

The stable abutment on the surface may be verified and/or corrected in S230. If stabilization does not pass a threshold and/or has not been independently verified, example methods may proceed to S235. For example, in S230, a user may input a verification of stabilization, such as by pressing a confirm button on the device or otherwise inputting stabilization. In this instance, only upon receipt of such input may example methods proceed from S230 to S240; otherwise, the instruction in S220 may remain, awaiting user verification in S230. Or, for example, the device may use any number of sensors, including an accelerometer, magnetometer, pressure sensor, etc., discussed above, to determine that the device has remained stable for a threshold period of time, and, if not, proceed to re-measure in S235 until stabilization is determined in S230. Similarly, the device may use the camera itself to detect motion through changing visuals, or use the camera to verify plane or surface presence in a steady manner within the captured environment.

Of course, any combination of user input, sensor feedback, and/or visual capture can be used as a filter in S235 to determine stabilization. For example, in S230 if a first sensor, for example, a level sensor, determines constant device level for several seconds, visual input may then be checked in S235. If the visual identification shows movement or unsteady phone orientation, then the level sensor threshold may be reset and check again in S220 and S230. If the visual identification shows a stable surface, then this may be considered verification of stabilization in S230, and example methods may proceed to S240. Of course, an additional or alternative user input check may further be used in S235. Similarly, thresholds and tolerances on sensor input for stabilization may be lowered or increased based on visual confirmation or not of stabilization in S235 and/or user verification. As such, user input, sensor input, and visual input may interplay in S230 and potentially in a looping manner through S235 while inputs are received, before stabilization is confirmed and methods proceed to S240.

In S240, a plane or other surface is established positionally based on the stabilization in S230. By knowing that the device, or at least the camera capturing the visual environment, is stable and co-located with the surface to be established, the surface and other relative features in that environment may be assessed and properly tracked, regardless of the quality or lack of ideal visual input. For example, even if a wall cannot be detected by AR programming in visual input because it is featureless or reflective, in S240, the wall may be presumed in a stable position with respect to the camera, and other detectable features may be presumed stable. These presumed stable elements may then used to establish or root the wall.

Similarly, in S240, additional input, potentially input gathered in S230 and/or S235, may be used to establish the surface in S240. For example, if a particular device edge or front/back is specified in S220, then the surface identified in S240 may be presumed stable and extending from that device portion, or at least oriented with regard to the camera in a known manner from that device portion, in the visual capture. Similarly, device orientation with gravity as determined from sensors may indicate whether a surface is horizontal or vertical, such as floors/ceilings or walls.

Once the surface is established in S240, it is output to the AR programming for use in augmentation or other rendering. This may include identifying and/or tagging the surface in the AR format in those standards incorporated above, or otherwise describing or transmitting the surface to another rendering/graphical processing application. Similarly, in S250, the surface determined in S200-S240 may be stored locally or remotely and later accessed for use in AR or other graphical applications, potentially by other devices than those establishing the surface.

As seen, in one example method from end-to-end, a user may activate AR on their mobile device, such as a tablet or smartphone, be instructed to place the device against a wall to be modified in AR, place the device against that wall, and have the device automatically identify the wall based on that positioning and establish that wall surface as an AR element, accurately tracked and modified in AR. In this way, a user may quickly and reliably input or enter the wall into the AR program, which could be a visual program that modifies the wall with augmented elements like object placement on the wall, wall recoloring to simulate painting, simulated wall removal or room renovation, etc. The user may never have to otherwise select the wall or input additional data to ensure the wall is properly tracked in AR, and it may not matter that the wall is blank, glossy, or nearly transparent like glass, in such an example, because the device's stable position can be used to root the wall in the surroundings.

Given the variety of example functions described herein, example embodiment devices and methods of establishing surfaces may be structured in a variety of ways to provide desired functionality. In devices, other divisions and/or omissions of structures and functionalities among any number of separate visual capture devices, modules, processors, and/or servers are useable, including execution on a single machine or among distant, exclusive servers and processors. Example methods may include user authentication, data verification, privacy controls, and/or content screening. For example, in example methods, data may be encrypted and not retained at one or all points in example methods, such that there may be no discoverable record of augmented reality, surrounding environment, and/or surface information. Example methods may take advantage of a user login model requiring user authentication with a password over a secured connection and/or using operating-system-native security control and verification on communications devices, to ensure only verified, permitted human users access example methods and potentially user accounts.

Some example methods being described here, it is understood that one or more example methods may be used in combination and/or repetitively to produce multiple options and functionalities for users of communications devices. Example methods may be performed through proper computer programming or hardware configuring of networks and communications devices to receive and perform and act in accordance with example methods, at any number of different processor-based devices that are communicatively connected. Similarly, example methods may be embodied on non-transitory computer-readable media that directly instruct computer processors to execute example methods and/or, through installation in memory operable in conjunction with a processor and user interface, configure general-purpose computers having the same into specific communications machines that execute example methods.

It will be appreciated by one skilled in the art that example embodiments may be varied through routine experimentation and without further inventive activity. For example, although a plane, like a flat wall, may be established for AR in some examples, it is understood that other surface shaped and orientations may also be established, for AR and other image processing or analysis, through device placement in examples. Variations are not to be regarded as departure from the spirit and scope of the exemplary embodiments, and all such modifications as would be obvious to one skilled in the art are intended to be included within the scope of the following claims.

What is claimed is:

1. A mobile device configured to establish a surface for graphical processing, the device comprising:
   a display;
   a camera; and
   a computer processor configured to,
      instruct, through the display, a user to stabilize the camera against the surface to be established,
      determine that the camera is in a position stabilized against the surface,
      capture, with the camera, environment at the position, and
      establish the surface within the environment using the position.

2. The mobile device of claim 1, wherein the computer processor is further configured to,
   augment the established surface in the environment as augmented reality.

3. The mobile device of claim 2, wherein the computer processor is further configured to,
   track, with the camera, the environment for the augmented reality before the instructing, wherein the augmenting tracks the established surface in the environment as augmented reality.

4. The mobile device of claim 1, wherein the surface is a featureless, reflective, or substantially transparent plane, and wherein the environment captured by the camera includes the plane.

5. The mobile device of claim 1, wherein the position is a position of the mobile device directly contacting the surface.

6. The mobile device of claim 1, wherein the determining includes sensing motion of the camera followed by a lack of motion indicating the camera is stabilized on the surface.

7. The mobile device of claim 1, further comprising:
   an accelerometer, wherein the determining uses at least one of user input, the accelerometer, and visual input from the camera to determine that the device is in the position stabilized against the surface.

8. A method of establishing a surface for graphical processing, the method comprising:
   instructing, with a display, a user to stabilize a camera against the surface to be established;
   determining, with a computer processor, that the camera is in a position stabilized against the surface;
   capturing, with the camera, environment at the position; and
   establishing, with the computer processor, the surface within the environment using the position.

9. The method of claim 8, further comprising:
   augmenting, with the computer processor, the established surface in the environment as augmented reality.

10. The method of claim 9, further comprising:
    tracking, with the computer processor and the camera, the environment for the augmented reality before the instructing, wherein the augmenting tracks the established surface in the environment as augmented reality.

11. The method of claim 8, wherein the surface is a featureless, reflective, or substantially transparent plane, and wherein the environment captured by the camera includes the plane.

12. The method of claim 8, wherein the display, computer processor, and camera are all co-located within a mobile device.

13. The method of claim 12, wherein the position is a position of the mobile device directly contacting the surface.

14. The method of claim 8, wherein the determining includes sensing motion of the camera followed by a lack of motion indicating the camera is stabilized on the surface.

15. The method of claim 8, wherein the determining uses at least one of user input, an accelerometer, and visual input from the camera to determine that the camera is in the position stabilized against the surface.

16. A method of establishing a wall for recoloring in augmented reality, the method comprising,
    establishing world tracking through an augmented reality application on a device having a camera, a display, and a processor;
    determining, with the processor, that the device has been stabilized on the wall;
    capturing, with the camera, an environment from the wall; and
    establishing the wall as an augmented reality element in the environment shown on the display through the augmented reality application.

17. The method of claim 16, further comprising:
    recoloring the wall as the augmented reality element in the environment shown on the display.

18. The method of claim 16, further comprising:
    instructing, through the display, the user to stabilize the device on the wall.

19. The method of claim 16, wherein the determining includes sensing motion of the device followed by a lack of motion indicating the device is stabilized on the wall.

20. The method of claim 16, wherein the determining uses at least one of user input, an accelerometer, and visual input from the camera to determine that the device is in the position stabilized against the wall.

* * * * *